US008691387B2

(12) United States Patent
Gilmartin et al.

(10) Patent No.: US 8,691,387 B2
(45) Date of Patent: Apr. 8, 2014

(54) TREATMENT OF CARBON BLACK WITH A FLUOROSILANE

(75) Inventors: Brian P. Gilmartin, Willamsville, NY (US); Liang-Bih Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 403 days.

(21) Appl. No.: 12/546,055

(22) Filed: Aug. 24, 2009

(65) Prior Publication Data

US 2011/0045305 A1 Feb. 24, 2011

(51) Int. Cl.

| | |
|---|---|
| ***B23B 27/20*** | (2006.01) |
| ***G03G 15/00*** | (2006.01) |
| ***G03G 15/14*** | (2006.01) |

(52) U.S. Cl.
USPC .......................... 428/411.1; 399/110; 399/121

(58) Field of Classification Search
None
See application file for complete search history.

(56) References Cited

U.S. PATENT DOCUMENTS

| | | | | |
|---|---|---|---|---|
| 5,484,675 | A * | 1/1996 | Tripp et al. | 430/110.2 |
| 5,761,595 | A * | 6/1998 | Tarnawskyj et al. | 399/308 |
| 5,849,399 | A * | 12/1998 | Law et al. | 428/212 |
| 2008/0107983 | A1* | 5/2008 | Yanus et al. | 430/58.8 |

OTHER PUBLICATIONS

Ampacet, Conductive Carbon Black, 2009, Ampacet, pp. 1-4.*

* cited by examiner

*Primary Examiner* — Callie Shosho
*Assistant Examiner* — Patrick English
(74) *Attorney, Agent, or Firm* — MH2 Technology Law Group LLP

(57) ABSTRACT

Provided are coating composites for imaging members, imaging members, and apparatuses for forming an image. In accordance with various embodiments, there is a coating composite for imaging components. The coating composite can include a film forming resin and a plurality of surface treated carbon black particles substantially uniformly dispersed in the film forming resin, wherein each of the plurality of surface treated carbon black particles includes one or more fluorosilanes bonded to a surface of the carbon black particle.

15 Claims, 3 Drawing Sheets

TREATMENT OF CARBON BLACK WITH A FLUOROSILANE

DETAILED DESCRIPTION

1. Field of Use

The present teachings relate to electrostatography and electrophotography and, more particularly, to intermediate transfer members including surface treated carbon black.

2. Background

In an electrophotographic imaging process, an electric field can be created by applying a bias voltage to the electrophotographic imaging components, consisting of resistive coating or layers. Further, the coatings and material layers are subjected to a bias voltage such that an electric field can be created in the coatings and material layers when the bias voltage is ON and be sufficiently electrically relaxable when the bias voltage is OFF so that electrostatic charges are not accumulated after an electrophotographic imaging process. The fields created are used to manipulate unfused toner image along the paper path, for example from photoreceptor to an intermediate transfer belt and from the intermediate transfer belt to paper, before fusing to form the fixed images. These electrically resistive coatings and material layers are typically required to exhibit resistivity in a range of about $10^7$ to about $10^{12}$ ohm/square and should possess mechanical and/or surface properties suitable for a particular application or use on a particular component. It has been difficult to consistently achieve this desired range of resistivity with known coating materials.

Carbon black is the most commonly used conductive agent for use in plastics, coatings, toners and printing inks. When used in electrically resistive coatings, the desired resistivity is typically achieved by varying the carbon black loading, as well as adding dopants and additives to the final composition of the material. However, its use in electrically resistive coatings is severely limited due to its steep percolation threshold. It is typically difficult to achieve resistivities in the range of $10^8$-$10^{12}$ Ω/square.

Accordingly, there is a need to overcome these and other problems of prior art to provide new methods of processing carbon black materials which can tailor the conductivity in the range difficult to achieve by pure, untreated carbon black.

SUMMARY

In accordance with various embodiments, there is a coating composite for imaging components. The coating composite can include a film forming resin and a plurality of surface treated carbon black particles substantially uniformly dispersed in the film forming resin, wherein each of the plurality of surface treated carbon black particles includes one or more fluorosilanes bonded to a surface of the carbon black particle.

According to another embodiment, there is an imaging component. The imaging component can include a substrate and a coating composite disposed over the substrate, the coating composite including a plurality of surface treated carbon black particles substantially uniformly dispersed in a film forming resin, wherein each of the plurality of surface treated carbon black particles comprises one or more fluorosilanes bonded to a surface of the carbon black particle, and wherein the coating composite has a surface resistivity in the range of about $10^6$ Ω/square to about $10^{13}$ Ω/square.

According to yet another embodiment, there is an apparatus for forming an image. The apparatus can include a charging station for uniformly charging a surface of an image receiving member and an imaging station for forming a latent image on the surface of the image receiving member. The apparatus can also include a developing station for converting the latent image to a visible image on the surface of the image receiving member, an intermediate transfer member positioned between the image receiving member and a transfer roller for transferring the developed image from the image receiving member to a media, wherein at least one of the intermediate member and the transfer member can include a coating composite, the coating composite including a plurality of surface treated carbon black particles substantially uniformly dispersed in a film forming resin, wherein each of the plurality of surface treated carbon black particles includes one or more fluorosilanes bonded to a surface of the carbon black particle, and wherein the coating composite has a surface resistivity in the range of about $10^6$ Ω/square to about $10^{13}$ Ω/square.

Additional advantages of the embodiments will be set forth in part in the description which follows, and in part will be obvious from the description, or may be learned by practice of the present teachings. The advantages will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
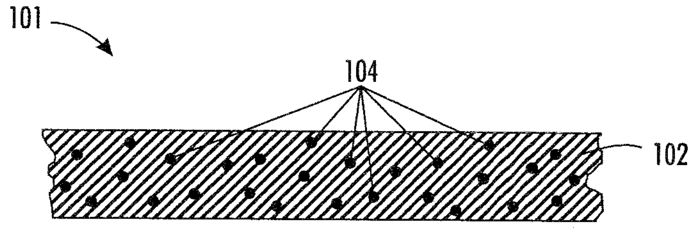
FIG. 1 schematically illustrates a cross sectional view of a portion of an exemplary coating composite 100 for imaging components, according to various embodiments of the present teachings.

FIG. 1 schematically illustrates a cross sectional view of a portion of an exemplary coating composite 101 for imaging components, according to various embodiments of the present teachings. The coating composite 101 can include a film forming resin 102 and a plurality of surface treated carbon black particles 104 substantially uniformly dispersed in the film forming resin 102. In some cases, the coating composite 101 can have a surface resistivity in the range of about $10^6$ Ω/square to about $10^{13}$ Ω/square and in other cases in the range of about $10^7$ Ω/square to about $10^{11}$ Ω/square. In various embodiments, each of the plurality of surface treated carbon black particles 104 can include one or more fluorosilanes bonded to a surface of the carbon black particle. Any suitable fluorosilane can be used, such as, for example, (heptadecafluoro-1,1,2,2-tetrahydrodecyl)trimethoxysilane, (heptadecafluoro-1,1,2,2-tetrahydrodecyl)triethoxysilane, (heptadecafluoro-1,1,2,2-tetrahydrodecyl)trichlorosilane, (heptadecafluoro-1,1,2,2-tetrahydrodecyl)methyldichlorosilane, (heptadecafluoro-1,1,2,2-tetrahydrodecyl)dimethylchlorosilane, hexadecafluorododec-11-en-1-yltrimethoxysilane and (3-heptafluoroisopropoxy)propyltrichlorosilane. In some cases, each of the plurality of surface treated carbon black particles 104 can include fluorine at the surface of the carbon black particle 104 in an amount ranging from about 1 atomic % to about 15 atomic %, in other cases from about 1 atomic % to about 10 atomic %, and in some other cases from about 5 atomic % to about 8 atomic %.

The coating composite 101 for imaging components shown in FIG. 1 can include any suitable film forming resin 102, such as, for example, polycarbonates, polyesters, polyurethanes, polystyrenes, polyarylethers, polyarylsulfones, polysulfones, polyethersulfones, polyphenylene sulfides, polyvinyl acetate, polyacrylates, polyvinyl acetals, polyamides, polyimides, amino resins, phenolic resins, phenoxy resins, epoxy resins, phenylene oxide resins, polystyrene and acrylonitrile copolymers, vinyl acetate copolymers, acrylate copolymers, alkyd resins, styrene-butadiene copolymers, styrene-alkyd resins, polyvinylcarbazole, and the like. In certain embodiments, the film forming resin 102 can include one or more of acrylic polyol, polyether polyol, and polyester polyol. In various embodiments, the plurality of surface treated carbon black particles 104 can be present in the film forming resin 102 in an amount ranging from about 0.1% to about 15% and in some cases from about 1% to about 10% by weight of the total solid weight of the coating composite 100 composition.

The coating composite 101 for imaging components shown in FIG. 1 can be used for any suitable imaging components of electrostatographic devices and electrophotographic devices. Exemplary imaging components can include, but are not limited to a bias charge roll, a bias transfer roll, a magnetic roller sleeve, an intermediate transfer belt, and a transfer belt.

Figure 2:
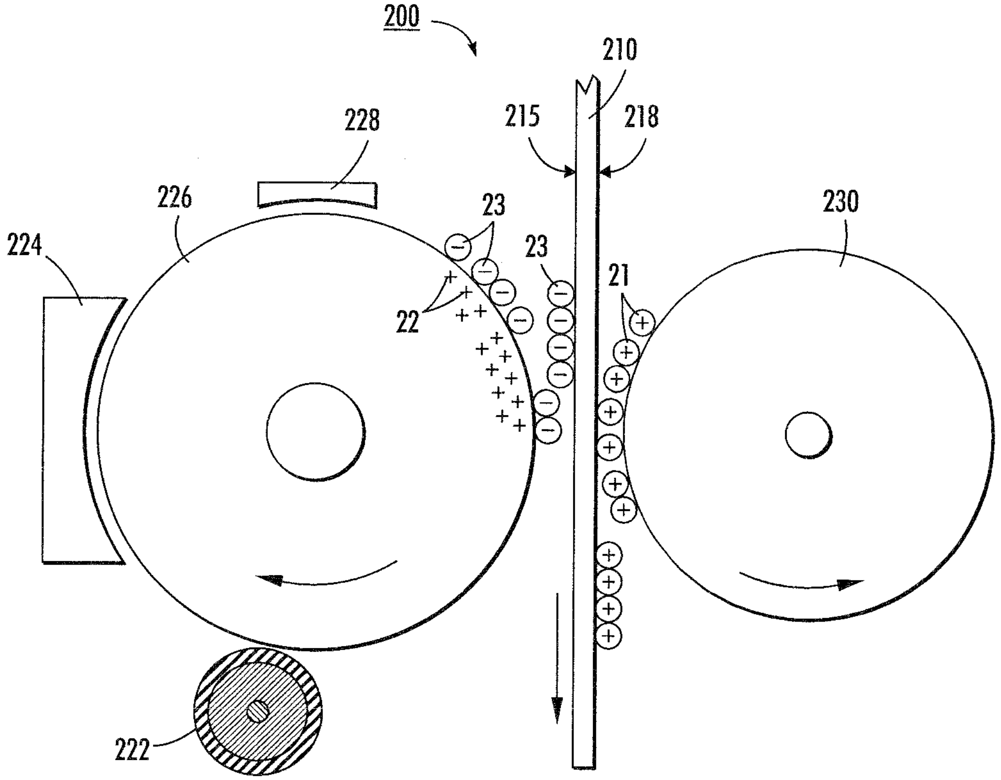
FIG. 2 schematically illustrates exemplary apparatus for forming an image, in accordance with various embodiments of the present teachings.

FIG. 2 is a schematic of an exemplary apparatus 200 for forming an image in accordance with the present teachings. In various embodiments, the apparatus 200 can be a multi-imaging system. As shown, the apparatus 200 can include an image receiving member 226 and a charging station 222 for uniformly charging a surface of the image receiving member 226. The image receiving member 226 can be exemplified by a photoreceptor drum as shown in FIG. 2, although other appropriate imaging members, for example, other electrostatographic imaging receptors such as ionographic belts and drums, or electrophotographic belts, can also be used for the apparatus 200. The charging station 222 can include any suitable charger such as a corotron, a scorotron or a bias charge roll. The apparatus 200 can also include an imaging station 224 where an original document (not shown) can be exposed to a light source (also not shown) for forming a latent image on the image receiving member 226, a developing station 228 for converting the latent image to a visible image on the image receiving member 226, an intermediate transfer member 210 positioned between the image receiving member 226 and a transfer roller 230 for transferring the developed image from the image receiving member 226 to a media. It should be readily apparent to one of ordinary skill in the art that the apparatus 200 depicted in FIG. 2 represents a generalized schematic illustration and that other members/stations/transfer means can be added or existing members/stations/transfer means can be removed or modified.

Generally, in an electrostatographic reproducing apparatus, a light image of an original to be copied can be recorded in the form of an electrostatic latent image upon a photosensitive member (e.g., the image receiving member 226) and the latent image can be subsequently rendered visible by the application of electroscopic thermoplastic resin particles which are commonly referred to as toner.

Referring to FIG. 2, the image receiving member 226 can be charged by the charging station 222 and can be imagewisely exposed to light from an optical system or an image input apparatus (e.g., 224) to form an electrostatic latent image thereon. The electrostatic latent image can then be developed by bringing a developer mixture (including toner) from the developing station 228 into contact therewith, resulting in a developed image. The developed image can then be transferred to the intermediate transfer member 210 and subsequently transferred to, a media, for example, a copy sheet (not shown) having a permanent image thereon.

Subsequent to the image development, the charged toner particles 23 from the developing station 228 can be attracted and held by the image receiving member 226 (e.g., photoreceptor drum), because the photoreceptor drum possesses a charge 22 opposite to that of the toner particles 23. It is noted in FIG. 2 that the toner particles 23 are shown as negatively charged and the photoreceptor drum 226 is shown as positively charged. In various embodiments, these charges can be reversed, depending on the nature of the toner and the machinery being used. In an exemplary embodiment, the toner can be present in a liquid developer. However, one of ordinary skill in the art will understand that the apparatus 200 can also be useful for dry development systems. After the toner particles have been deposited on the photoconductive surface of the image receiving member 226, the developed image can be transferred to the intermediate transfer member 210.

In this manner, in a multi-image system for example, each of the images can be formed on the exemplary photoreceptor drum (see 226) by the image input apparatus 224, developed sequentially by the developing station 228, and transferred to the intermediate transfer member 210, when each image involves a liquid image. In an alternative method, each image can be formed on the photoreceptor drum, developed, and transferred in registration to the intermediate transfer member 210, when each image involves a dry image.

In an exemplary embodiment, the multi-image system can be a color copying system. In this color copying system, each color of an image being copied can be formed on the photoreceptor drum (see 226). Each color image can be developed and transferred to the intermediate transfer member 210. In an alternative method, each color of an image can be formed on the photoreceptor drum (see 226), developed, and transferred in registration to the intermediate transfer member 210.

The transfer roller 230 can be positioned opposite to the photoreceptor drum 226 having the intermediate transfer member 210 there between. The transfer roller 230 can be a biased transfer roller having a higher voltage than the surface of the photoreceptor drum. The biased transfer roller 230 can charge the backside 218 of the intermediate transfer member 210 with, for example, a positive charge. Alternatively, a corona or any other charging mechanism can be used to charge the backside 218 of the intermediate transfer member 210. Meanwhile, the negatively charged toner particles 23 can be attracted to the front side 215 of the intermediate transfer member 210 by the exemplary positive charge 21 on the backside 218 of the intermediate transfer member 210.

After the toner latent image has been transferred from the image receiving member 226, exemplary photoreceptor drum to the intermediate transfer member 210, the intermediate transfer member 210 can be contacted under heat and pressure to an image receiving substrate, i.e. a media (not shown). The toner image on the intermediate transfer member 210 can then be transferred and fixed (as permanent image) to the media (not shown) such as a copy sheet.

The intermediate transfer member 210 and the bias transfer roll 230 can include the coating composite 101 shown in FIG. 1. The intermediate transfer member 210 can have various forms including, but not limit to, a belt, a sheet, a web, a film, a roll, and a tube. In some embodiments, the intermediate transfer member 210 can be one of the intermediate transfer members as described in FIGS. 3 and 4.

Figure 3:
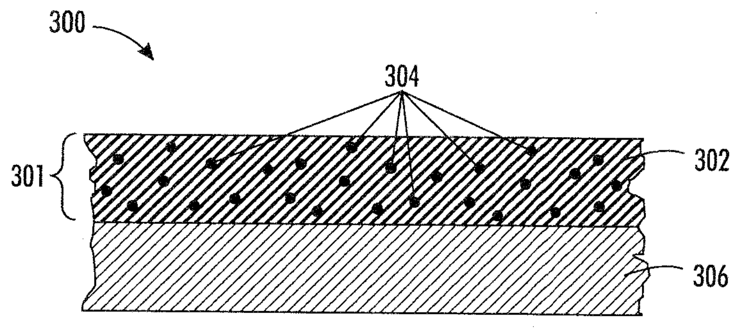
FIG. 3 schematically illustrates a cross sectional view of a portion of an exemplary imaging component, in accordance with various embodiments of the present teachings.

FIG. 3 schematically illustrates a cross sectional view of a portion of an exemplary imaging component 300, such as, for example, the intermediate transfer member 210 and the biased transfer roller 230 shown in FIG. 2. The exemplary imaging component 300 can include a coating composite 301 disposed over a substrate 306. In various embodiments, the coating composite 301 can include a plurality of surface treated carbon black particles 304 substantially uniformly dispersed in a film forming resin 302, wherein the coating composite 301 can have a surface resistivity in the range of about $10^6$ Ω/square to about $10^{13}$ Ω/square and in some cases in the range of about $10^7$ Ω/square to about $10^{11}$ Ω/square. In various embodiments, each of the plurality of surface treated carbon black particles 304 can include one or more fluorosilanes bonded to a surface of the carbon black particle. In various embodiments, the substrate 306 of the imaging component 300 can be in the form of at least one of a sheet, a belt, a film, or a cylindrical roll. The substrate 306 can include at least one of polystyrene, acrylic, styrene-acrylic copolymer, styrene-butadiene copolymer, polyamide, polyimide, polyethylene, polyethylene terephthalate, polyethylene naphthalate, polypropylene, polyvinyl chloride, polyester, polyurethane, polyvinyl alcohol, or vinyl ether resin.

Figure 4:
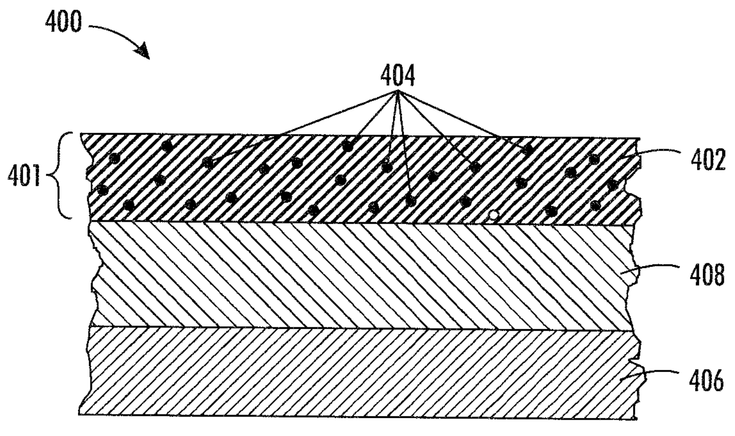
FIG. 4 schematically illustrates a cross sectional view of a portion of another exemplary imaging component, according to various embodiments of the present teachings.

FIG. 4 schematically illustrates a cross sectional view of a portion of another exemplary imaging component 400, such as, for example, bias charge roll 222 shown in FIG. 2. The exemplary imaging component 400 can include a conductive core, an elastomeric layer 408 disposed over the conductive core, and a coating composite 401 disposed over the elastomeric layer 408. In various embodiments, the coating composite 401 can include a plurality of surface treated carbon black particles 404 substantially uniformly dispersed in a film forming resin 402, wherein the coating composite 401 can have a surface resistivity in the range of about $10^6$ Ω/square to about $10^{13}$ Ω/square and in some cases in the range of about $10^7$ Ω/square to about $10^{11}$ Ω/square. In various embodiments, each of the plurality of surface treated carbon black particles 404 can include one or more fluorosilanes bonded to a surface of the carbon black particle. The elastomeric layer 408 can include any suitable material including, but not limited to, one or more of neoprene, nitrile rubber, polyurethane rubber, epichlorohydrin rubber, or silicone rubber. The conductive core 406 can include any conducting material, such as, for example, steel.

Any other imaging component, such as, for example, a magnetic roller sleeve and a transfer belt can include the coating composite 101, 301, 401, in a configuration as shown in FIGS. 1, 3, and 4.

In various embodiments, the surface treated carbon black particles 104, 304, 404 shown in FIGS. 1, 3, and 4 can be distributed in the film forming resin 102, 302, 402 of each imaging components 300, 400 by a physical mixing (i.e., non-covalent mixing) and/or a chemical mixing (i.e., covalent reaction). In some embodiments, the plurality of surface treated carbon black particles can be incorporated during in-situ processes, such as, for example, an in-situ crosslinking, an in-situ polymerization, and/or an in-situ curing process, of the film forming resins of interest. For example, the plurality of surface treated carbon black particles can be dispersed uniformly in a solution of melamine-formaldehyde resin and hydroxylated acrylic resin before the step of coating and curing. In another example, the plurality of surface treated carbon black particles can be dispersed uniformly throughout a polyimide matrix during an in-situ polymerization of the polyimide monomers. In yet another example, the plurality of surface treated carbon black particles can be dispersed throughout an epoxy type polymer matrix during the curing process of the epoxy.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of Surface-Treated Carbon Black

About 10.01 g of Vulcan XC-72 carbon black (Cabot Corporation, Boston, Mass.) was added to about 108.47 g of dodecane and 1.079 g of (heptadecafluoro-1,1,2,2-tetrahydrodecyl)triethoxysilane (FOETES; Gelest, Inc., Morrisville, Pa.) in a 500 ml round bottom flask and sonicated for about 5 minutes, and then heated to reflux. The sample was allowed to stir for about 18 hours, at which point the sample was cooled to room temperature and filtered. The carbon black was washed with hexane, allowed to dry in vacuum, and analyzed by X-ray Photoelectron Spectroscopy (XPS). The XPS results shown in Table 1 confirm the attachment of FOETES onto the surface of the carbon black particles.

TABLE 1

| Sample | % C | % O | % F |
|---|---|---|---|
| Untreated Vulcan XC72 | 98.9 | 1.1 | 0.0 |
| FOETES-treated Vulcan XC72 | 92.2 | 1.4 | 6.4 |

Example 2

Dispersion of Surface-Treated Carbon Black in a Film Forming Resin

Dispersions were prepared by adding the FOETES-treated carbon black in various concentrations to about 1:1 mixture (by total solid weight) of Cymel 323 (a melamine from Cytec Industries Inc., Woodland Park, N.J.) and Paraloid AT-410 (Rohm & Haas Co., Philadelphia, Pa.) in methyl ethyl ketone (60% total solids). As a control, similar samples were prepared with untreated carbon black. The samples were added to about 80 g of ⅛" stainless steel shot and roll milled over the course of about 64 hours. The shot was removed by passing the dispersions through a fine cotton filter (about 280 μm).

Example 3

Formation of Coating Composite

Figure 5:
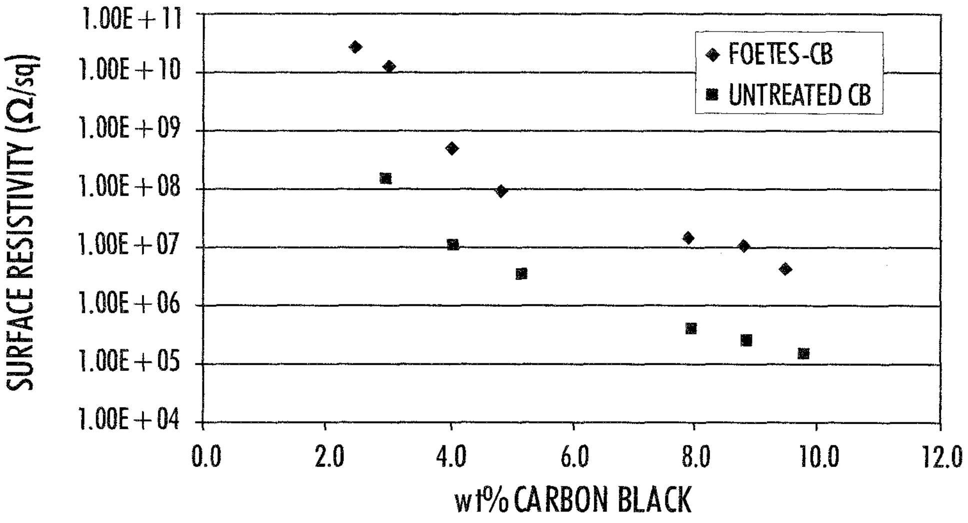
FIG. 5 is a graph showing measured surface resistivity for a film including untreated and FOETES surface-treated carbon black as a function of solid weight % of carbon black in the film, in accordance with various embodiments of the present teachings.

Each of the dispersion of Example 2 was subsequently coated on a PET substrate using about 2 mil bird bar. The films were dried in a convection oven for about 10 minutes at about 140° C. giving about 20 μm thick films. Surface resistivity was measured using a Hiresta UP Resistivity Meter with a supply voltage of about 10V. FIG. 5 is a graph showing measured resistivity for untreated and FOETES surface-treated carbon black as a function of solid weight % of carbon black in the film. The graph shows that treating the surface of the carbon black with FOETES increases the resistivity by almost two orders of magnitude in the weight range studied and shows that untreated carbon black is not able to achieve the resistivity range of the FOETES-treated carbon black, going over the measurable limit of resistivity (>$10^{13}$ Ω/square) at about 2.4 wt. % carbon black.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the phrase “one or more of”, for example, A, B, and C means any of the following: either A, B, or C alone; or combinations of two, such as A and B, B and C, and A and C; or combinations of three A, B and C.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A coating composite for imaging components comprising:

a film forming resin; and a plurality of surface treated carbon black particles dispersed in the film forming resin, wherein each of the plurality of surface treated carbon black particles comprises more than one fluorosilanes bonded to a surface of the carbon black particle;

the plurality of surface treated carbon black particles are present in an amount ranging from about 2.5% to about 5% by weight of the total solid weight of the coating composite;

the coating composite has a surface resistivity in the range of about $10^{8}$ Ω/square to about $10^{13}$ Ω/square; and the surface resistivity decreases by at most a factor of 25 for each percentage increase by weight in the amount of the plurality of surface treated carbon black particles, wherein the more than one fluorosilanes comprises (heptadecafluoro-1,1,2,2-tetrahydrodecyl)trimethoxysilane and one or more of (heptadecafluoro-1,1,2,2-tetrahydrodecyl)triethoxysilane, (heptadecafluoro-1,1,2,2-tetrahydrodecyl)trichlorosilane, (heptadecafluoro-1,1,2,2-tetrahydrodecyl)methyldichlorosilane, (heptadecafluoro-1,1,2,2-tetrahydrodecyl)dimethylchlorosilane, hexadecafluorododec-11-en-1-yltrimethoxysilane and (3-heptafluoroisopropoxy)propyltrichlorosilane.

2. The coating composite for imaging components of claim 1, wherein each of the plurality of surface treated carbon black particles comprises fluorine at the surface of the carbon black particle in an amount ranging from about 1 atomic % to about 15 atomic %.

3. The coating composite for imaging components of claim 1, wherein the film forming resin comprises at least one of polycarbonates, polyesters, polyurethanes, polystyrenes, polyarylethers, polyarylsulfones, polysulfones, polyethersulfones, polyphenylene sulfides, polyvinyl acetate, polyacrylates, polyvinyl acetals, polyamides, polyimides, amino resins, phenolic resins, phenoxy resins, epoxy resins, phenylene oxide resins, polystyrene and acrylonitrile copolymers, vinyl acetate copolymers, acrylate copolymers, alkyd resins, styrene-butadiene copolymers, styrene-alkyd resins, and polyvinylcarbazole.

4. The coating composite for imaging components of claim 1, wherein the film forming resin comprises one or more of acrylic polyol, polyether polyol, and polyester polyol.

5. An imaging component comprising:

a substrate;

a coating composite disposed over the substrate, the coating composite comprising a plurality of surface treated carbon black particles dispersed in a film forming resin; and adding the plurality of surface treated carbon black particles in an amount ranging from about 2.5% to about 5% by weight of the total solid weight of the coating composite, wherein each of the plurality of surface treated carbon black particles comprises more than one fluorosilanes bonded to a surface of the carbon black particle;

the coating composite has a surface resistivity in the range of about $10^{8}$ Ω/square to about $10^{13}$ Ω/square; and the surface resistivity of the coating composite decreases by at most a factor of 25 for each percentage increase by weight in the amount of the plurality of surface treated carbon black particles, wherein the more than one fluorosilanes comprises (heptadecafluoro-1,1,2,2-tetrahydrodecyl)trimethoxysilane and one or more of (heptadecafluoro-1,1,2,2-tetrahydrodecyl)triethoxysilane, (heptadecafluoro-1,1,2,2-tetrahydrodecyl)trichlorosilane, (heptadecafluoro-1,1,2,2-tetrahydrodecyl)methyldichlorosilane, (heptadecafluoro-1,1,2,2-tetrahvdrodecvl)dimethylchlorosilane, hexadecafluorododec-11-en-1-yltrimethoxysilane and (3-heptafluoroisopropoxy)propyltrichlorosilane.

6. The imaging component of claim 5, wherein each of the plurality of surface treated carbon black particles comprises fluorine present at the surface of the carbon black particle in an amount ranging from about 1 atomic % to about 15 atomic %.

7. The imaging component of claim 5, wherein the film forming resin comprises at least one of polycarbonates, polyesters, polyurethanes, polystyrenes, polyarylethers, polyarylsulfones, polysulfones, polyethersulfones, polyphenylene sulfides, polyvinyl acetate, polyacrylates, polyvinyl acetals, polyamides, polyimides, amino resins, phenolic resins, phenoxy resins, epoxy resins, phenylene oxide resins, polystyrene and acrylonitrile copolymers, vinyl acetate copolymers, acrylate copolymers, alkyd resins, styrene-butadiene copolymers, styrene-alkyd resins, and polyvinylcarbazole.

8. The imaging component of claim 5, wherein the film forming resin comprises one or more of acrylic polyol, polyether polyol, and polyester polyol.

9. The imaging component of claim 5, wherein the substrate comprises at least one of polystyrene, acrylic, styrene-acrylic copolymer, styrene-butadiene copolymer, polyamide, polyimide, polyethylene, polyethylene terephthalate, polyethylene naphthalate, polypropylene, polyvinyl chloride, polyester, polyurethane, polyvinyl alcohol, or vinyl ether resin.

10. The imaging component of claim 5 further comprising:

an elastomeric layer disposed over the substrate, wherein the elastomeric layer comprises one or more of neoprene, nitrile rubber, polyurethane rubber, epichlorohydrin rubber, or silicone rubber; wherein the coating composite is disposed over the elastomeric layer.

11. The imaging component of claim 5, wherein the imaging component is selected from the group consisting of a bias charge roll, a bias transfer roll, a magnetic roller sleeve, an intermediate transfer belt, and a transfer belt.

12. The imaging component of claim 5, wherein the substrate is in the form of at least one of a sheet, a belt, a film, or a cylindrical roll.

13. An apparatus for forming an image comprising:

a charging station for uniformly charging a surface of an image receiving member;

an imaging station for forming a latent image on the surface of the image receiving member;

a developing station for converting the latent image to a visible image on the surface of the image receiving member;

an intermediate transfer member positioned between the image receiving member and a transfer roller for transferring the developed image from the image receiving member to a media, wherein at least one of the intermediate transfer member and the transfer roller comprises a coating composite, the coating composite comprising a plurality of surface treated carbon black particles dispersed in a film forming resin in an amount ranging from about 2.5% to about 5% by weight of the total solid weight of the coating composite, wherein each of the plurality of surface treated carbon black particles comprises more than one fluorosilanes bonded to a surface of the carbon black particle, wherein the coating composite has a surface resistivity in the range of about $10^8$ Ω/square to about $10^{13}$ Ω/square, and wherein the surface resistivity of the coating composite decreases by at most a factor of 25 for each percentage increase by weight in the amount of the plurality of surface treated carbon black particle, wherein the more than one fluorosilanes comprises (heptadecafluoro-1,1,2,2-tetrahydrodecyl)trimethoxysilane and one or more of (heptadecafluoro-1,1,2,2-tetrahydrodecyl)triethoxysilane, (heptadecafluoro-1,1,2,2-tetrahydrodecyl)trichlorosilane, (heptadecafluoro-1,1,2,2-tetrahydrodecyl)methyldichlorosilane, (heptadecafluoro-1,1,2,2-tetrahydrodecyl)dimethylchlorosilane, hexadecafluorododec-11-en-1-yltrimethoxysilane and (3-heptafluoroisopropoxy)propyltrichlorosilane.

14. The apparatus for forming an image of claim 13, wherein the charging station comprises a bias charge roll.

15. The apparatus for forming an image of claim 14, wherein the bias charge roll comprises:

a conductive core;

an elastomeric layer disposed over the conductive core; and a coating composite disposed over the elastomeric layer, the coating composite comprising a plurality of surface treated carbon black particles dispersed in a film forming resin in an amount ranging from about 0.1% to about 5% by weight of the total solid weight of the coating composite disposed over the elastomeric layer, wherein each of the plurality of surface treated carbon black particles comprises one or more fluorosilanes bonded to a surface of the carbon black particle, and wherein the coating composite has a surface resistivity in the range of about $10^8$ Ω/square to about $10^{13}$ Ω/square.

* * * * *